(12) United States Patent
Gumaste (10) Patent No.: US 7,035,539 B2
(45) Date of Patent: Apr. 25, 2006

(54) INTERCONNECTING NODES IN AN OPTICAL COMMUNICATION SYSTEM

(75) Inventor: Ashwin Gumaste, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 10/042,813

(22) Filed: Jan. 9, 2002

(65) Prior Publication Data
US 2004/0208573 A1   Oct. 21, 2004

(51) Int. Cl.
*G02F 2/00* (2006.01)
*H04B 10/00* (2006.01)
*H04J 14/00* (2006.01)
*H04L 12/50* (2006.01)
*H04L 12/28* (2006.01)

(52) U.S. Cl. .............................. 398/57; 398/2; 398/55; 398/45; 370/380; 370/392; 370/400

(58) Field of Classification Search .................. 398/45, 398/48, 55, 58, 59, 61, 165, 166, 167, 2, 398/57; 370/389, 392, 400, 401, 403–406, 370/217, 218, 221, 222, 223, 224, 380; 714/4; 710/38
See application file for complete search history.

(56) References Cited

U.S. PATENT DOCUMENTS

| | | | |
|---|---|---|---|
| 4,733,391 A | 3/1988 | Godbold et al. ............... 370/88 |
| 4,914,648 A | 4/1990 | Acampora et al. .............. 370/3 |
| 5,023,942 A | 6/1991 | Goepel ........................ 455/601 |
| 5,506,711 A | 4/1996 | Takeyari ...................... 359/117 |
| 5,592,610 A * | 1/1997 | Chittor ........................... 714/4 |
| 5,652,751 A | 7/1997 | Sharony ...................... 370/227 |
| 5,859,983 A | 1/1999 | Heller et al. ................. 395/200 |
| 5,901,148 A | 5/1999 | Bowen et al. .............. 370/452 |
| 5,946,321 A | 8/1999 | Dean .......................... 370/451 |
| 6,075,631 A * | 6/2000 | Bala et al. ...................... 398/1 |
| 6,138,166 A | 10/2000 | Heller et al. ................ 709/251 |
| 6,138,167 A * | 10/2000 | Heller et al. ................ 709/251 |
| 2002/0027877 A1* | 3/2002 | Son et al. .................... 370/218 |
| 2003/0215238 A1* | 11/2003 | Milton et al. .................. 398/83 |

OTHER PUBLICATIONS

Logethetis, D., "Reliability Analysis of the Double Counter-Rotating Ring with Concentrator Attachments," *IEEE/ACM Transactions of Networking*, vol. 2 #5 © Oct. 1994.

To, P.P., et al., "Multistar Implementation of Expandable ShuffleNets," *IEEE/ACM Transaction of Networking*, vol. 2 #4 © Aug. 1994.

Iness, J., et al. "GEMNET: A Generalized, Shuffle-Exchange-Based, Regular, Scalable, Modular, Multihop, WDM Lightwave Network," *IEEE/ACM Transactions of Networking*, vol. 3 #4 © Aug. 1995.

* cited by examiner

*Primary Examiner*—Agustin Bello
*Assistant Examiner*—Nathan Curs
(74) *Attorney, Agent, or Firm*—Baker Botts L.L.P.

(57) ABSTRACT

A sub-network of a communication network includes four nodes, with each node having two input ports and two output ports. The first node and the fourth node each link both of their input ports and one of their output ports to other nodes of the sub-network, with each of their remaining output ports operable to send signals outside of the sub-network. The second and third nodes link both of their output ports and one of their input ports to other nodes of the sub-network while each of their remaining input ports is operable to receive signals from outside of the sub-network.

16 Claims, 4 Drawing Sheets

INTERCONNECTING NODES IN AN OPTICAL COMMUNICATION SYSTEM

TECHNICAL FIELD OF THE INVENTION

The present invention relates generally to communication systems and, more particularly, to interconnecting nodes in an optical communication system.

BACKGROUND OF THE INVENTION

In optical communication systems, the interconnections between nodes define, to a large extent, scalability of networks and performance of communications. A number of interconnection strategies have been proposed, with each resulting topology offering various advantages and/or disadvantages compared with others. However, the ever changing requirements of communication systems often pose challenges that highlight inadequacies of existing topologies.

SUMMARY OF THE INVENTION

In accordance with the present invention, techniques for interconnecting nodes in an optical communication system are provided which substantially reduce or eliminate disadvantages and problems associated with previous techniques.

According to one embodiment of the present invention, a sub-network of an optical communication network includes a first node, a second node, a third node, and a fourth node. The first node has two input ports and two output ports, with the input ports and one of the output ports coupled to other nodes of the sub-network and the other output port operable to send signals outside of the sub-network. The second node has two input ports and two output ports, with the output ports and one of the input ports coupled to other nodes of the sub-network and the other input port operable to receive signals from outside of the sub-network. The third node has two input ports and two output ports, with the output ports and one of the input ports coupled to other nodes of the sub-network and the other input port operable to receive signals from outside of the sub-network. The fourth node has two input ports and two output ports, with the input ports and one of the output ports coupled to other nodes of the sub-network and the other output port operable to send signals outside of the sub-network.

Embodiments of the invention provide various technical advantages. The interconnections within sub-networks and between sub-networks provide scalability. Sub-networks may be interconnected such that additional sub-networks can be added with only minimal changes to existing links. Moreover, as sub-networks are added to a network, the average path distance between nodes in the network increases linearly. That is, the average distance between nodes increases linearly as the number of nodes increases. These qualities make this topology particularly attractive for relatively small communication networks, such as metropolitan area networks.

The topology provided by interconnecting nodes using these techniques also provides fault tolerance. According to particular embodiments, a communications network using this topology may continue to operate given the loss of 50 percent of nodes within the network. Thus, the nodes within a network may be configured to support protection, since half of the nodes may be configured as protection nodes.

In addition, the topology proposed facilitates a relatively simple routing algorithm for communicating information between nodes. This provides, for example, a topology that supports the implementation of packet switched communications protocols. Thus, proposed topologies, while supporting existing standards, also support a migration from light-paths to light-frames.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
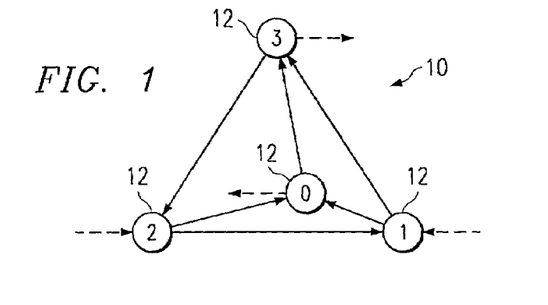
FIG. 1 illustrates interconnections between nodes of an optical communication system in accordance with one embodiment of the present invention.

FIG. 1 illustrates an optical communication sub-network, indicated generally at 10, that includes four interconnected nodes 12. Each node 12 has two input ports and two output ports, and the solid and dotted lines illustrate the interconnections of these input and output ports. As illustrated by this logical representation, the four nodes 12 forming the sub-network may be envisioned as four points of a pyramid with various interconnections forming the edges of the pyramid. This sub-network provides a building block, and one or more of these sub-networks may be interconnected to form optical communication networks of any appropriate size.

In the embodiment illustrated, nodes 12 are labeled from 0 to 3, referred to as nodes $n_0$, $n_1$, $n_2$, and $n_3$. Thus, sub-network 10 includes node $n_0$, node $n_1$, node $n_2$, and node $n_3$. Each node 12 in sub-network 10 has four ports, two input ports and two output ports, and couples at least three ports to other nodes 12 within sub-network 10. Thus, the solid lines represent links between nodes 12 in sub-network 10, while the dashed lines represent available links for coupling sub-network 10 to other sub-networks. Within sub-network 10, these links form a ring between nodes $n_0$, $n_3$, $n_2$, and $n_1$. Also, sub-network 10 has links across this ring from node $n_1$ to node $n_3$ and from node $n_2$ to node $n_0$. To couple with other sub-networks, sub-network 10 uses output ports at node $n_0$ and node $n_3$ and input ports at node $n_1$ and node $n_2$. Therefore, as each node 12 within sub-network 12 has two input ports and two output ports, network 10 similarly has two input ports and two output ports. Thus, sub-network 10 may be linked with other sub-networks in order to scale for larger optical communication networks. However, in an optical communication network having only four nodes 12, additional links within the sub-network may be formed. For example, the output port of node $n_0$ may couple to the input port of node $n_2$, and the output port of node $n_3$ may couple to the input port of node $n_1$.

Figure 2:
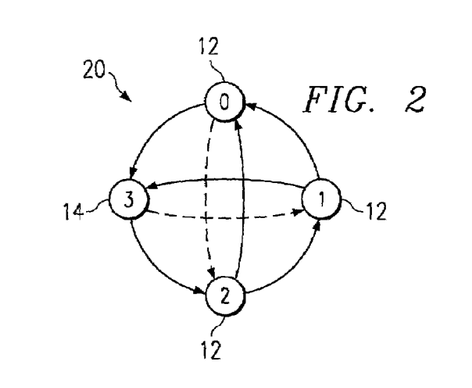
FIG. 2 illustrates the interconnections between the nodes using a different perspective.

FIG. 2 is a diagram illustrating exemplary interconnections between four nodes 12 in a communication sub-network 20 in which all input ports and output ports of nodes 12 are coupled to other nodes 12 within sub-network 20. Moreover, in this graphical representation, nodes 12 are illustrated in a ring configuration. This aids in illustrating the various pathways formed by the interconnections between nodes 12 of sub-network 20. As with the lines in FIG. 1, the solid lines in FIG. 2 illustrate the "standard" links between nodes 12 in sub-network 20, while the dashed lines represent the ports and connections available for linking to other sub-networks or, as illustrated in this example, for linking within sub-network 20.

In operation, sub-network 20 will display favorable performance in the delivery of communications between nodes 12. From any node 12 within sub-network 20, the average hops to reach a destination is one (providing an average hop distance of unity within sub-network 20). That is, on average, a communication needs to travel only along a single link in sub-network 20 to reach its destination. For example, consider a packet received by node $n_1$ for delivery to one of nodes 12 within sub-network 20. If the packet is destined for node $n_1$, no hops are necessary to delivery the packet. For delivering the packet to node $n_0$ or node $n_3$, only a single hop is needed, and to deliver the packet to node $n_2$, two hops are needed. Thus, the average number of hops to deliver a packet from node $n_1$ is one. A quick examination demonstrates that similar results obtain for communications from node $n_0$, node $n_2$, or node $n_3$. Therefore, the average number of hops for a communication within sub-network 20 is one. As will be demonstrated later, as additional sub-networks are linked together, the average number of hops increases linearly. This provides particular advantages in networks having relatively small numbers of interconnected nodes, such as metropolitan communication networks.

However, while FIGS. 1 and 2 illustrate sub-networks 10 and 20 as a pyramid and a ring, respectively, it should be understood that these are merely logical representations designed to illustrate interconnections between nodes 12. Thus, the actual shapes formed by arrangements of nodes 12 within one or more sub-networks may be dictated by various geographical and other criteria, and the techniques disclosed do not constrain these arrangements, but rather provide techniques for interconnecting various nodes 12. Moreover, while the links between nodes 12 are illustrated as lines, these links may include any appropriate intermediate components, such as optical amplifiers.

Figure 3:
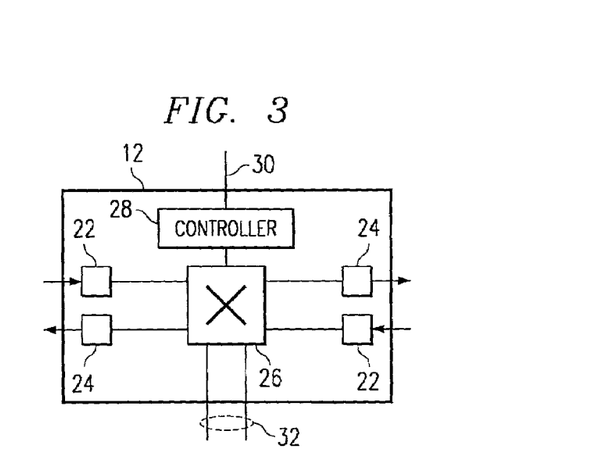
FIG. 3 is a block diagram illustrating exemplary functional components of a node from the communication network.

FIG. 3 is a block diagram illustrating exemplary functional components of node 12 that include input ports 22, output ports 24, an optical cross-connect, add/drop multiplexer module 26, and a controller 28. In general, node 12 provides for the receipt, routing, and communication of circuit switched and/or packet switched communications. More specifically, within a communication sub-network, three of ports 22 and 24 within node 12 will couple to other nodes 12 within the sub-network. The remaining port may couple to node 12 in another sub-network or, in certain circumstances, may couple to another node 12 in the same sub-network.

Input ports 22 and output ports 24 each represent hardware, including appropriate logic, for coupling to and communicating with other communications equipment. For example, input ports 22 may include optical receivers for coupling to optical fibers and for receiving and decoding optical information signals. Similarly, output ports 24 may include lasers, modulators, filters, and other appropriate equipment for coupling to optical fibers and communicating optical information signals.

Within node 12, module 26 links input ports 22 and output ports 24 to support the appropriate communication of information through node 12. Thus, module 26 supports the switching of lightpaths or light-frames between input ports 22 and output ports 24. In addition, module 26 couples to add/drop lines 32 and adds and removes communications from input ports 22 and output ports 24. For example, add/drop lines 32 may link to a local network, with node 12 providing the local network access to other networks.

Node 12 also includes controller 28, which controls the operation of elements within node 12. For example, based on configurations and/or commands received on control line 30, controller 28 may direct the routing of communications between input ports 22 and output ports 24. Moreover, controller 28 may include routing algorithms for determining an appropriate output port 24 for delivering a communication to its intended destination. In addition, while not shown in this embodiment, node 12 may include various add/drop multiplexers for introducing communications onto optical fibers or delivering communications.

However, while the particular embodiment illustrated and the preceding description focus on a particular combination and arrangement of functional elements, node 12 may include any appropriate combination and arrangement of elements that include functionality for two input ports and two output ports. Thus, specific elements illustrated and functionalities described may be separated, combined, rearranged, or otherwise modified.

Figure 4:
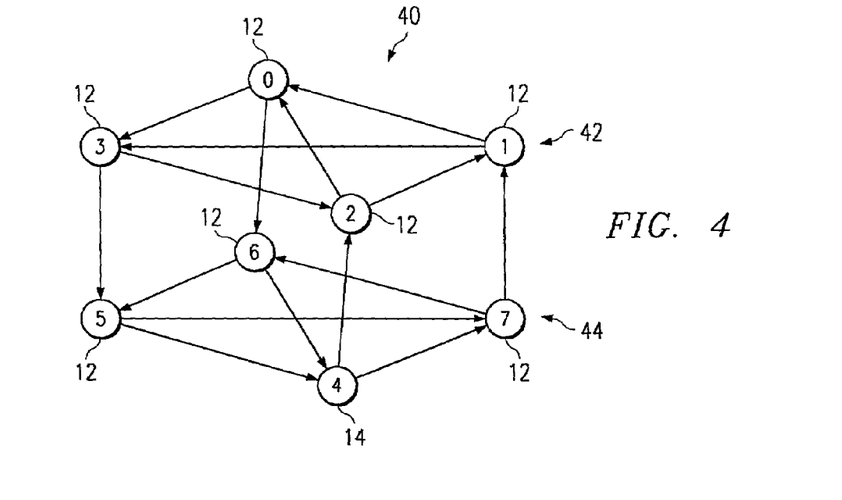
FIG. 4 illustrates interconnections between nodes in a communication network having two sub-networks in accordance with one embodiment of the present invention.

FIG. 4 is a diagram illustrating an optical communication network 40 that includes a first sub-network 42 linked to a second sub-network 44. Network 40 provides eight nodes, from node $n_0$ to node $n_7$, with sub-network 42 formed by nodes $n_0$, $n_1$, $n_2$ and $n_3$, and sub-network 44 formed by nodes $n_4$, $n_5$, $n_6$ and $n_7$. In network 40, the two output ports from sub-network 42 link to the two input ports of sub-network 44. Thus, node $n_0$ links to node $n_6$ and node $n_3$ links to node $n_5$. Similarly, the two output ports of sub-network 44 link to the two input ports of sub-network 42. Thus, node $n_4$ links to node $n_2$ and node $n_7$ links to node $n_1$.

As evidenced by this illustration, the interconnections between nodes 12 formed using these techniques create a number of "rings" between nodes 12. These rings provide for rapid delivery of communications to appropriate destinations as well as a high tolerance against defaults. Given the interconnections shown, fifty percent of nodes 12 may fail without completely disrupting communications between the remaining nodes 12. This characteristic remains true as the number of appropriately interconnected sub-networks is increased.

Figure 5:
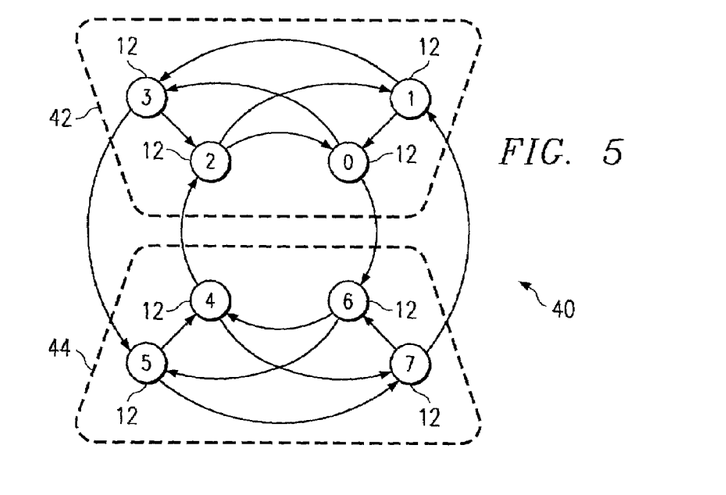
FIG. 5 illustrates an alternative perspective of the interconnections between nodes in a communication network having two sub-networks.

FIG. 5 is a diagram illustrating an alternative representation of the interconnections between nodes 12 of network 40. Thus, the same interconnections between nodes 12 are illustrated as were shown in FIG. 4, while the relative positions of nodes have been altered. As evident in this illustration, the links between nodes 12 form two counter-directional rings. In the clockwise direction, decreasingly numbered even nodes 12 are linked (with the exception of the link from node $n_0$ to node $n_6$). In the counterclockwise direction, odd numbered nodes 12 are linked in increasing order (with the exception of the link from node $n_7$ to node $n_1$). To add an additional sub-network or sub-networks into network 40, only two links need to be altered.

For example, to add a new sub-network into network 40, the link between node $n_3$ and node $n_5$ and the link between node n4 and node $n_2$ may be broken and these various input and output ports then coupled to the appropriate input and output ports of the new sub-network. Similarly, the new sub-network could be added by breaking the link between node $n_0$ and node $n_6$ and the link between node $n_7$ and node $n_1$ and then reforming appropriate links between input and output ports of the existing and additional sub-networks. This provides for a minimal disturbance of existing interconnections between nodes 12 when linking additional sub-networks. This reduces costs associated with the time, personnel, and equipment required for linking and retuning links when additional nodes are added to a communication network.

Figure 6:
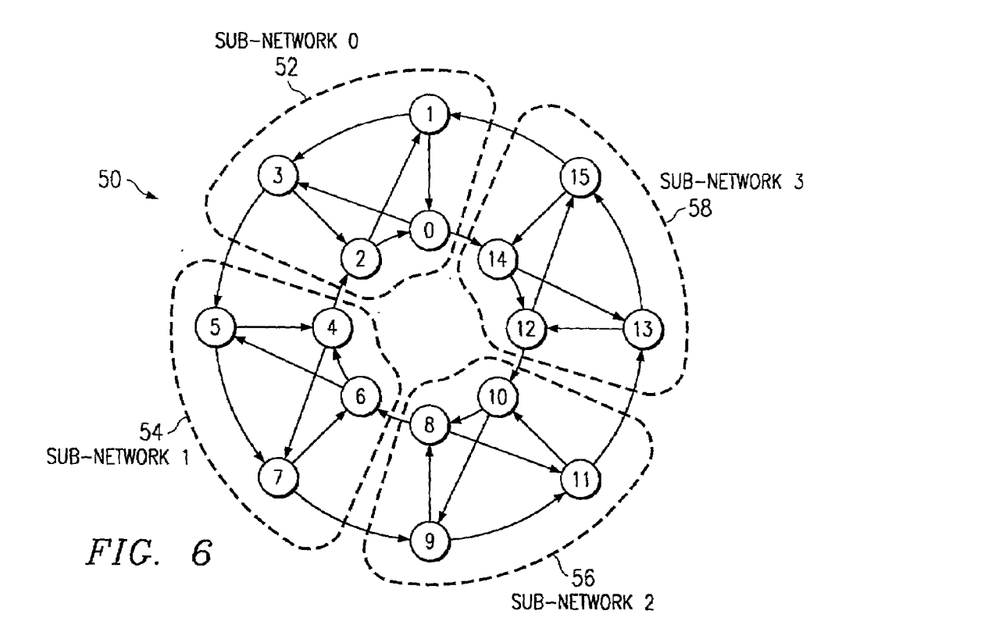
FIG. 6 illustrates interconnections between nodes in a communication network having four sub-networks in accordance with one embodiment of the present invention.

FIG. 6 illustrates an optical communication network 50 that includes four interconnected sub-networks 52, 54, 56, and 58 (referred to, respectively, as sub-network $sn_0$, $sn_1$, $sn_2$, and $sn_3$). Given the numbering system used in this illustration, each sub-network may be characterized by four nodes numbered 4n, 1+4n, 2+4n, and 3+4n, with n having the value of the corresponding sub-network. For example, sub-network $sn_2$ includes nodes $n_8$, $n_9$, $n_{10}$ and $n_{11}$, corresponding to the values obtained from 4×2, 1+4×2, 2+4×2, and 3+4×2.

Within each sub-network, nodes 4n and 3+4n serve as output ports, and nodes 1+4n and 2+4n serve as input ports. When represented in binary notation, the number or address of any node 12 may be divided into a sub-network address and a local address. For example, the binary representation for node $n_{13}$ is $1110_2$. The first two digits, 11, correspond to a sub-network address of three, while the last two digits 10 correspond to a local address of two. Thus, this address represents the second node within sub-network $sn_3$.

In the embodiment illustrated, links are formed between sub-networks according to a particular scheme. The output port at node 4n of a sub-network links to the input port of node 2+4(n−1), except for the "wrap-around" where, for example, node $n_0$ links to node $n_{14}$. The second output port of each sub-network, at node 3+4n, links to the input port of node 1+4(n+1), except for the wrap-around, for example, between node $n_{15}$ and node $n_1$. This linking of ports forms two counter-rotating rings between the nodes of sub-networks within network 50.

Given the interconnections between sub-networks as illustrated in this embodiment, nodes 12 may use relatively simple algorithms for routing communications to destination nodes 12. Upon receiving a communication, node 12 determines whether it is destined for another node 12 within the same sub-network. For example, a communication may be addressed to a binary address having the format of xxdd. Given this address, xx identifies the destination sub-network while dd identifies the destination node 12 within the destination sub-network. If the destination sub-network address matches the current sub-network, node 12 routes the communication within the current sub-network. For communications within a sub-network, shortest path routing decisions are readily apparent. For example, node $n_1$ may route a received packet directly to node $n_0$ or node $n_3$, or may route a packet to node $n_2$ via node $n_3$. Thus, node $n_1$, upon receiving an in sub-network communication, determines whether the destination (dd) is itself (01). If not, node $n_1$ determines whether the destination is $00_2$. If so, node $n_1$ delivers the communication to node $n_0$, otherwise node $n_1$ delivers the communication to node $n_3$. Other nodes 12 may perform similar in sub-network routing.

For communications addressed to "foreign" sub-networks, node 12 determines whether the destination sub-network is closer in a clockwise or counterclockwise direction. Node 12 then forwards the communication to and out the appropriate port of the current sub-network. For example, using binary notation, assume node $0001_2$ receives a communication destined to node $0101_2$. The destination sub-network, 01, is closer to the current sub-network, $00_2$, in a counterclockwise direction. This indicates that the appropriate output port is $11_2$. Thus, node $0001_2$ forwards the communication to the output port 112 of sub-network $sn_0$, node $0011_2$, which in turn forwards the communication to node $0101_2$.

For sub-networks equally distant regardless of the direction traveled, the algorithm may default to a particular output port. For example, for a packet in sub-network $sn_0$ destined for sub-network $sn_2$, the number of intervening sub-networks is equal in both a clockwise and counterclockwise direction. Thus, nodes 12 may default to a particular output port from the current sub-network given this situation. This provides efficient routing that, except in certain limited circumstances, provides shortest path routing. Moreover, if shortest path routing is critical or desired, more complicated algorithms that account for path distances between specific nodes 12 may be implemented.

Figure 7:
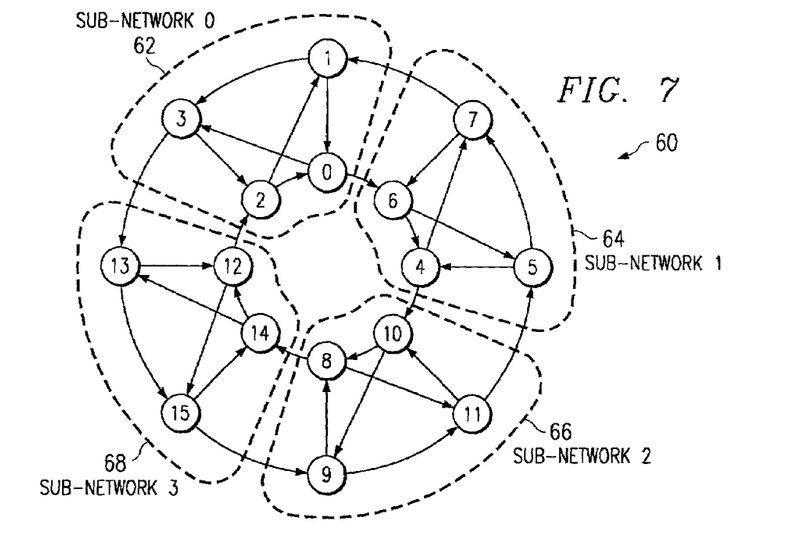
FIG. 7 illustrates an alternative addressing scheme for the nodes in a communication network having four sub-networks.

FIG. 7 illustrates an optical communication network 60 that includes four sub-networks 62, 64, 66, and 68. Network 60 illustrates an alternative embodiment for interconnecting sub-networks than the embodiment shown in network 50. In network 60, nodes 12 are coupled such that each node 4n links an output port to the input port of node 2+4(n+1), and node 3+4n links an output port to the input port of node 1+4(n−1). Network 60 provides similar advantages to those provided by previous networks, however, routing algorithms may require minor alterations in order to operate appropriately.

Figure 8:
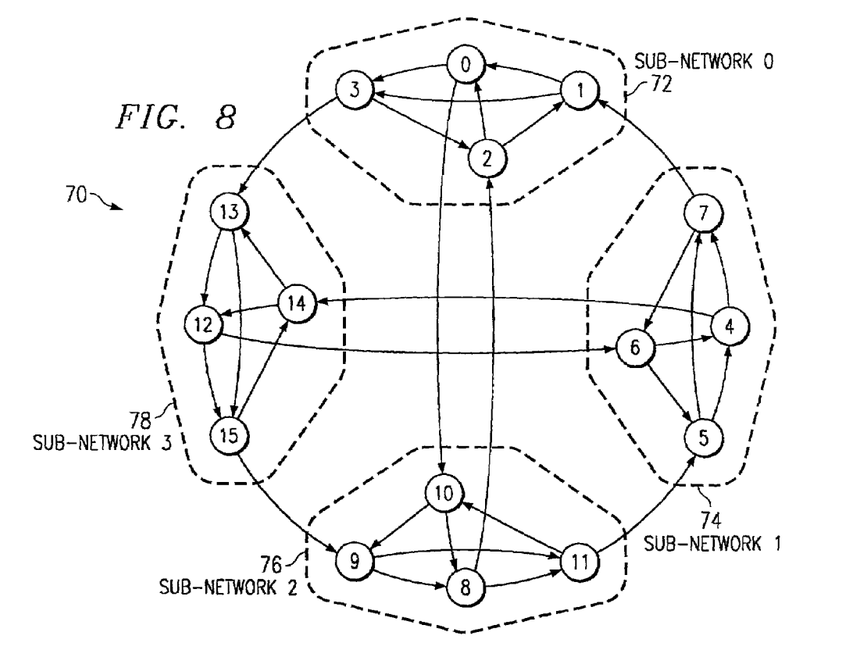
FIG. 8 illustrates alternative interconnections between nodes in a communication network having four sub-networks in accordance with one embodiment of the present invention.

FIG. 8 illustrates an optical communications network 70 that includes sub-networks 72, 74, 76, and 78. As illustrated in this embodiment, when four sub-networks are interconnected, the sub-networks may be linked together in the same arrangement as nodes within each individual sub-network. That is, the output ports of sub-network $sn_0$ link to input ports of sub-networks $sn_2$ and $sn_3$; the output ports of sub-network $sn_1$ link to input ports of sub-networks $sn_0$ and $sn_3$; the output ports of sub-network $sn_2$ link to input ports of sub-networks $sn_0$ and $sn_1$; and the output ports of sub-network $sn_3$ link to input ports of sub-networks $sn_1$ and $sn_2$. This configuration of sub-networks may provide additional advantages when compared to other techniques for linking sub-networks. However, as with network 60, routing algorithms for transmitting communications between nodes 12 in network 70 may be different than those used for other configurations of sub-networks.

Figure 9:
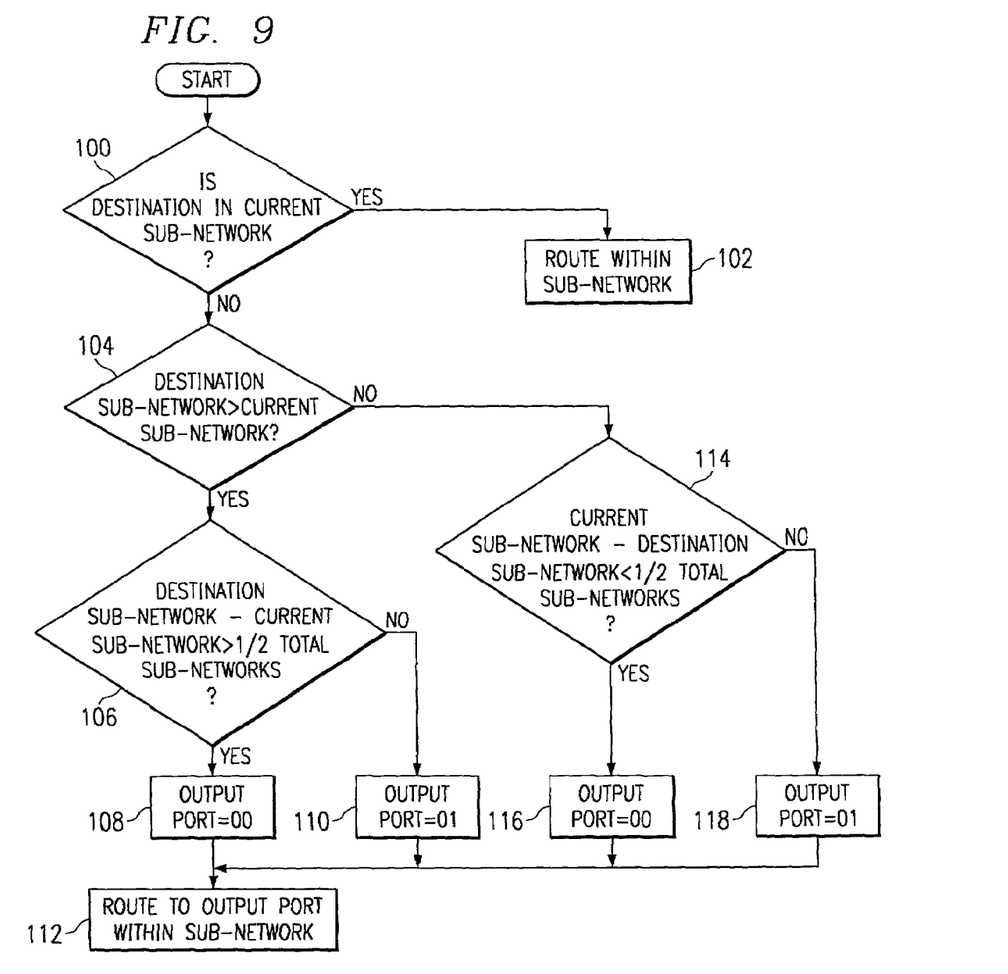
FIG. 9 is a flowchart illustrating a method for routing communications between nodes in the communication networks.

FIG. 9 is a flowchart illustrating a method for routing communications between nodes 12. This flowchart and the following description detail the routing of a packet within a network having a configuration as detailed with respect to network 50. That is, within each sub-network, an output port of node 4n links to an input port of node 2+4(n−1) and an output port of node 3+4n links to an input port of 1+4(n+1).

Upon receiving a communication, such as a packet, node 12 determines whether the destination for the communication is within the current sub-network at step 100. For example, node 12 may compare the destination sub-network address of the communication with a current sub-network address. If the address is matched, node 12 routes the communication within the current sub-network at step 102. As previously discussed, node 12 may use relatively simple determinations in order to appropriately route communications to other nodes 12 within the sub-network.

If the destination is not within the current sub-network, node 12 determines whether the destination sub-network is greater than the current sub-network at step 104. If so, node 12 determines whether the difference between the destination sub-network and the current sub-network is greater than one-half the total number of sub-networks at step 106. This permits node 12 to determine the appropriate direction for routing the communication. If the difference is greater than one-half the total number of sub-networks, the appropriate direction of travel for the communication is clockwise, and node 12 sets the output port to $00_2$ at step 108. If the difference is not greater than one-half the total number of sub-networks, node 12 defaults to routing the communication in a counter-clockwise direction and thus sets the output port to $01_2$ at step 110. After determining the appropriate output port, node 12 routes the communication to the selected output port within the sub-network at step 112.

If the destination sub-network is not greater than the current sub-network, the logic for determining an appropriate output port inverts. Thus, given the circumstance, node 12 determines whether the difference between the current sub-network and the destination sub-network is less than one-half the total of sub-networks at step 114. If so, the appropriate direction of travel for the communication is clockwise, and node 12 sets the output port to $00_2$ at step 116. Otherwise, node 12 defaults to forwarding the communication in a counterclockwise direction and sets the output port to $01_2$ at step 118. After appropriately setting the output port, node 12 routes the communication to the selected output port within the sub-network at step 112.

The preceding flowchart illustrates only an exemplary method of operation, and nodes 12 may use any suitable techniques for routing communications between elements of a network. Thus, many of the steps in this flowchart may take place simultaneously and/or in different orders than as shown. In addition, nodes 12 may use methods with additional steps, fewer steps, and/or different steps, so long as the methods remain appropriate. For example, given various techniques for linking sub-networks within a network, the methods used for routing communications should be tailored accordingly. Therefore, the example provided by this flowchart is merely illustrative, and node 12 contemplates using any suitable steps for routing communications.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A sub-network of an optical communication network, the sub-network comprising:

four nodes each having two input ports and two output ports;

a first one of the nodes having the input ports and one of the output ports coupled to other ones of the nodes, and wherein the other output port of the first node is operable to send signals outside of the sub-network;

a second one of the nodes having the output ports and one of the input ports coupled to other ones of the nodes, and wherein the other input port of the second node is operable to receive signals from outside of the sub-network;

a third one of the nodes having the output ports and one of the input ports coupled to other ones of the nodes, and wherein the other input port of the third node is operable to receive signals from outside of the sub-network; and a fourth one of the nodes having the input ports and one of the output ports coupled to other ones of the nodes, and wherein the other output port of the fourth node is operable to send signals outside of the sub-network;

wherein each of the nodes is operable to:

receive a packet comprising a destination address;

determine an output port from the sub-network based on the destination address; and route the packet to one of the first node and the fourth node corresponding to the determined output port.

2. The sub-network of claim 1, wherein:

one of the output ports of the first node couples to one of the input ports of the fourth node;

one of the output ports of the second node couples to one of the input ports of the first node and the other of the output ports of the second node couples to one of the input ports of the fourth node;

one of the output ports of the third node couples to one of the input ports of the first node and the other of the output ports of the third node couples to one of the input ports of the second node; and one of the output ports of the fourth node couples to one of the input ports of the third node.

3. The sub-network of claim 1, wherein one of the output ports of the first node couples to a second sub-network and one of the input ports of the second node couples to the second sub-network, the second sub-network comprising:

four nodes each having two input ports and two output ports;

a first one of the nodes having the input ports and one of the output ports coupled to other ones of the nodes, and wherein the other output port of the first node is operable to send signals outside of the sub-network;

a second one of the nodes having the output ports and one of the input ports coupled to other ones of the nodes, and wherein the other input port of the second node is operable to receive signals from outside of the sub-network;

a third one of the nodes having the output ports and one of the input ports coupled to other ones of the nodes, and wherein the other input port of the third node is operable to receive signals from outside of the sub-network; and a fourth one of the nodes having the input ports and one of the output ports coupled to other ones of the nodes, and wherein the other output port of the fourth node is operable to send signals outside of the sub-network.

4. The sub-network of claim 3, wherein:

the other output port of the fourth node of the sub-network couples to the other input port of the second node of the second sub-network; and the other output port of the first node of the second sub-network couples to the other input port of the third node of the sub-network.

5. The sub-network of claim 1, wherein each of the nodes is further operable to determine the output port based on the total number of sub-networks forming a communication network, the determined output port selected to minimize the number of intermediate sub-networks to reach the destination address.

6. The sub-network of claim 1, wherein each of the nodes further comprises an add/drop module operable to:
   couple to add/drop lines;
   route communications from the input ports of the node to an add/drop line; and
   route communications from an add/drop line to the output ports of the node.

7. A communication network comprising a plurality of sub-networks, each sub-network comprising:
   four nodes each having two input ports and two output ports;
   a first one of the nodes having the input ports and one of the output ports coupled to other ones of the nodes in the sub-network, and wherein the other output port of the first node couples to another one of the sub-networks;
   a second one of the nodes having the output ports and one of the input ports coupled to other ones of the nodes in the sub-network, and wherein the other input port of the second node couples to another one of the sub-networks;
   a third one of the nodes having the output ports and one of the input ports coupled to other ones of the nodes in the sub-network, and wherein the other input port of the third node couples to another one of the sub-networks; and
   a fourth one of the nodes having the input ports and one of the output ports coupled to other ones of the nodes in the sub-network, and wherein the other output port of the fourth node couples to another one of the sub-networks; wherein each of the nodes is operable to:
   receive a packet comprising a destination address;
   determine an output port from the sub-network based on the destination address; and
   route the packet to one of the first node and the fourth node corresponding to the determined output port.

8. The network of claim 7, wherein, within each sub-network:
   one of the output ports of the first node couples to one of the input ports of the fourth node;
   one of the output ports of the second node couples to one of the input ports of the first node and the other of the output ports of the second node couples to one of the input ports of the fourth node;
   one of the output ports of the third node couples to one of the input ports of the first node and the other of the output ports of the third node couples to one of the input ports of the second node; and
   one of the output ports of the fourth node couples to one of the input ports of the third node.

9. The network of claim 7, wherein, within each sub-network:
   the other output port of the first node couples to the other input port of the third node of a first other one of the sub-networks; and
   the other output port of the fourth node couples to the other input port of the second node of a second other one of the sub-networks.

10. The network of claim 9, wherein, within each sub-network:
    the other input port of the second node couples to the other output port of the fourth node of the first other sub-network; and
    the other input port of the third node couples to the other input port of the first node of the second other sub-network.

11. The network of claim 7, wherein each of the nodes is further operable to determine the output port based on the total number of sub-networks forming the communication network, the determined output port selected to minimize the number of intermediate sub-networks to reach the destination address.

12. The network of claim 7, wherein, within each sub-network, each of the nodes further comprises an add/drop module operable to:
    couple to add/drop lines;
    route communications from the input ports of the node to an add/drop line; and
    route communications from an add/drop line to the output ports of the node.

13. A sub-network of an optical communication network, the sub-network comprising:
    a first node, a second node, a third node, and a fourth node interconnected to form a first unidirectional communication ring with direct communications links from the fourth node to the third node, the third node to the second node, the second node to the first node, and the first node to the fourth node;
    the second node further connected to the fourth node to form a second unidirectional communication ring with direct communications links from the second node to the fourth node, the fourth node to the third node, and the third node to the second node; and
    the third node further connected to the first node to form a third unidirectional communication ring with direct communications links from the third node to the first node, the first node to the fourth node, and the fourth node to the third node; wherein:
    an output port of the first node couples to an input port of a node in a second sub-network, an input port of the second node couples to an output port of a node in the second sub-network, an input port of the third node couples to an output port of a node in a third sub-network, and an output port of the fourth node couples to an input port of a node in the third sub-network, and wherein:
    each of the first node, the second node, the third node, and the fourth node is operable to receive a packet with a destination address indicating a node external to the sub-network and to determine a selected output port chosen from the output port of the first node and the output port of the fourth node, the selected output port chosen to minimize the number of intermediate sub-networks between the selected output port and the external node indicated by the destination address.

14. The sub-network of claim 13, wherein the direct communications links from one node to an other node are formed by coupling an output port of the one node to an input port of the other node.

15. The sub-network of claim 13, wherein:
    the first node is further connected to the third node to form a fourth unidirectional communication ring with direct communications links from the first node to the third node, the third node to the second node, and the second node to the first node; and the fourth node is further connected to the second node to form a fifth unidirectional communication ring with direct communications links from the fourth node to the second node, the second node to the first node, and the first node to the fourth node.

16. The sub-network of claim 13, wherein:

an output port of the first node couples to an input port of a node in another sub-network;

an input port of the second node couples to an output port of a node in another sub-network an input port of the third node couples to an output port of a node in another sub-network; and an output port of the fourth node couples to an input port of a node in another sub-network.

* * * * *

UNITED STATES PATENT AND TRADEMARK OFFICE
CERTIFICATE OF CORRECTION

PATENT NO.       : 7,035,539 B2
APPLICATION NO.  : 10/042813
DATED            : April 25, 2006
INVENTOR(S)      : Ashwin A. Gumaste It is certified that error appears in the above-identified patent and that said Letters Patent is hereby corrected as shown below:

Column 5, Line 16, after "between node" delete "n4" and insert --$n_4$--.
Column 6, Line 23, after "port" delete "112" and insert --$11_2$--.

Signed and Sealed this

Twenty-second Day of July, 2008

JON W. DUDAS
*Director of the United States Patent and Trademark Office*